United States Patent Office 3,733,274
Patented May 15, 1973

3,733,274
FLUID LOSS CONTROL AGENT
Mao H. Yueh and Wesley A. Jordan, Minneapolis, Minn., assignors to General Mills, Inc., Minneapolis, Minn.
No Drawing. Filed Dec. 11, 1970, Ser. No. 97,345
Int. Cl. C10m 3/08
U.S. Cl. 252—8.5 C                    12 Claims

ABSTRACT OF THE DISCLOSURE

A fluid loss control agent is disclosed including solubilized nucleoprotein such as from fish milt, or avian blood. The fluid loss control agent may be included in aqueous fluids used in oil and gas wells. Such aqueous fluids include drilling muds, completion fluids and hydraulic fracturing fluids.

---

This invention relates to fluid loss control agents and more particularly to such agents used in oil and gas well drilling fluids such as those used in the rotary method of boring oil and gas wells.

Aqueous fluids are employed in many oil and gas well development and stimulation operations. Drilling of the well generally requires use of an aqueous drilling fluid. In this instance the drilling fluid is a drilling mud, which, for example, lubricates the drill bit and pipe, carries cuttings from the bottom of the well to the surface, prevents cave in of the well walls during drilling and provides a hydrostatic head thereby controlling premature flow of oil or gas from the well. The drilling mud will typically include water, an added or native clay such as attapulgite clay, a fluid loss control agent such as starch, and any of various other additives such as salt, thinners, or pH adjusters (i.e. amines).

The newly bored well may be flushed with an aqueous completion fluid to clean out extraneous matter. The aqueous cleaning fluids (i.e. completion fluids and workover fluids) typically include water, salt and a fluid loss control agent. Also old oil wells may be cleaned out using aqueous workover fluids.

The new well may be fractured using hydraulic methods thereby increasing the production capabilities of the well. Also old oil wells, which are no longer producing satisfactorily, may be stimulated by hydraulic fracturing of the oil bearing formations. The hydraulic fracturing fluid typically includes water, a fluid loss control agent, and an aggregate such as sand.

Thus aqueous fluids for use in oil and gas wells are known which include a fluid loss control agent or in other words a fluid loss inhibitor. The primary function of a fluid loss control agent is to prevent penetration and loss of the fluid into the various formations of the well. Fluid loss control agents also are added to fracturing fluids to prevent leak off of pressure thereby permitting build up of sufficient hydraulic pressure for fracturing. Certain fluid loss control agents reduce friction during pumping of the fluid. Fluid loss control agents used in the past typically included guar gum, pregelatinized starch, silica flour and finely ground oil soluble resins or combinations of such materials.

The present invention provides a new and more functional fluid loss control agent, namely, solubilized nucleoprotein material. The present fluid loss control agent may be produced by adding to water a nucleoprotein material and a substance that will solubilize the nucleoprotein material, preferably an inorganic or an organic salt. Such a nucleoprotein sol may be produced in a concentrated form and later added to the aqueous fluid (i.e. drilling mud) together with any other materials that may be used in the aqueous fluid (i.e. clay, sand or other fluid loss inhibitors). Alternatively, the nucleoprotein material may be solubilized in situ in the aqueous fluid. In this instance the nucleoprotein material and the solubilizing substance are added directly to the aqueous fluid. The present fluid loss control agent provides reduced fluid loss, a reduced tendency of the clay to settle and reduced friction during pumping.

Fish milt is the preferred nucleoprotein material. Fish milt is one of the waste products of the fish processing industry. It is made up primarily of the fish sperm surrounded by connective tissue. Analysis of the milt shows that it contains large amounts—i.e. 90% or more of deoxyribonucleoprotein wherein the protein is protamine. Normally the milt is combined with other fish wastes and utilized to some extent as a hatchery feed. Some biochemical companies use the milt as a raw material for the preparation of DNA (deoxyribonucleic acid). More often than not, the milt is simply disposed of with the rest of the fish waste products.

The fish milt may be used in its crude moist form in the present invention and need only be finely ground or blended prior to solubilization. If the fish milt is to be stored for any extended period of time prior to use, the fish milt may be frozen or treated in any of various ways for purposes of stabilization and, if desired, for purification and concentration. The milt material may be heated and/or treated with a lower aliphatic alcohol to deactivate enzymes. It has been found that fresh milt may be preserved by adding small quantities of the sodium salt of ethylene diamine tetracetic acid, sodium arsenate and/or 5-nitrofurfuralsemicarbazone. The use of small quantities of each of these materials is preferred. Although not essential to the invention, the material may be treated to remove cell walls and tissue. The material may be finely ground or blended to obtain uniform size and homogeneity of the ultimate sol.

The milt may be heated to effect at least partial enzyme deactivation. Where the heating temperatures are high—i.e. 90° C. or above—the treatment times should be short. For example, if the heating temperature is between 106 and 116° C., the time may be about 2 to 4 seconds. Where the heating temperatures are below about 90° C.—i.e. about 50 to 90° C.—the treatment may be carried out for from a few minutes to an hour or more—i.e. about 5 minutes to two hours. It has been found that the above heat treatments are effective in extending the useful life of the milt solids. However, care must be exercised to prevent the denaturization of the milt solids—i.e. the deoxyribonucleoproteins.

It is especially preferred to treat the milt solids with a lower aliphatic alcohol of 1 to about 5 carbon for purposes of deactivating the enzymes and drying the material. Especially preferred alcohols are methanol, ethanol and isopropanol. The milt solids may be dispersed in the alcohol and then recovered. It is preferred to use from about 2 to about 30 volumes of the alcohol based on the volume of the milt solids. From an economic standpoint, the use of about 2 to about 10 volumes is especially preferred. The alcohol may be cold or heated to as high as its boiling point in the case of methanol, ethanol and isopropanol, or to about 90° C. in the case of the alcohols having boiling points above such temperature. The fish milt material may be concentrated or dehydrated by conventional techniques such as vacuum, drum, tray, freeze drying and the like.

The solubilized nucleoprotein material is present in an amount sufficient to produce the desired fluid loss control. When the nucleoprotein is from fish milt, the solubilizing substance may be an inorganic salt, typically sodium chloride, calcium chloride, calcium nitrate, zinc chloride and the like. Alternatively, the solubilizing substance may be an organic salt such as anionic surfactants (typically sodium dodecyl sulfate, dioctyl sodium sulfosuccinate, sodium dodecyl sulfonate, sodium decyl benzene sulfonate and the like); soaps (typically sodium stearate, sodium palmitate, sodium oleate and the like) and amphoteric surfactants (typically sodium N-coco β-amino propionate, N-coco β-amino propionic acid, stearyl betaine and the like). When the nucleoprotein is solubilized using such organic salts, foaming may occur. It is desirable to destroy the foam, for example, by adding a defoaming agent such as pine oil and a deflocculant such as the sodium salt of polyacrylic acid. The nucleoprotein may be solubilized using combinations of two or more of such solubilizing substances or salts.

The nucleoprotein is present in the aqueous fluid in an amount of at least 0.01% by weight and may be as high as 1.0% or more. Preferably the nucleoprotein is present at about 0.1% to 0.5% by weight. The nucleoprotein is typically present at about 0.25% to 0.5% by weight. The amount of salt required for solubilizing the nucleoprotein depends somewhat on the particular salt used and the amount of nucleoprotein material present. For example, when the fluid contains 0.1% by weight fish milt material, approximately 6.0% by weight sodium chloride is required to solubilize the nucleoprotein material. Therefore, the preferred level of inorganic salt is at least about 6.0% by weight based on the total weight of the fluid. The upper limit of inorganic salt may be a water solution saturated with the salt. Saturated solutions of salt are particularly desirable if the well is being bored through a salt formation since such solutions have less tendency to erode away the well walls by dissolving the salt formation. The salt may be typically present in an amount of about 25% by weight. When the fluid contains 0.1% by weight fish milt material, approximately 0.04% by weight sodium dodecyl sulfate solubilizes the nucleoprotein material. The organic salt when used will generally be present in an amount of from 0.04 to 1.0% by weight. "Parts" and "percentage" as used herein will mean parts or percentage by weight unless stated to the contrary.

Nucleoprotein material from other sources may be used such as avian blood, and various organ tissue such as thymus, spleen, pancreas, liver and testes. The term "nucleoprotein material" as used herein means a material containing at least 0.5% nucleoprotein. Nucleoprotein from such sources may be used in the same amounts as described with respect to fish milt. Nucleoprotein from sources other than fish milt, however, require use of the organic salts for solubilization. For this reason fish milt nucleoprotein material is generally preferred. The organic salts may be of the same types and used in the same amounts as described with respect to fish milt.

The nucleoprotein material used in the present invention may be avian blood erythrocytes or a fraction obtained from avian blood erythrocytes by processing in various ways to increase the concentration of deoxyribonucleoprotein and correspondingly reduce color. This procedure is carried out by hemolyzing the erythrocytes thus releasing the hemoglobin. Various hemolyzing agents can be employed to rupture the cell walls of the erythrocytes. A preferred hemolyzing agent is saponin which can be employed in low concentrations—i.e. from about 0.01 to 1.9% by weight based on the dry weight of the erythrocytes. After the hemolysis is completed, the solids can be washed, preferably with water or dilute aqueous NaCl solutions to remove the soluble materials and especially the hemoglobin. The erythrocytes per se or any fraction thereof may also be treated with a lower aliphatic alcohol of from 1 to about 5 carbon atoms. Such treatment tends to deactivate enzymes and other microorganisms, thus preventing deterioration. Additionally, the blood from which the erythrocytes are obtained may be treated with heparin and/or sodium citrate to prevent clotting and thus facilitate the separation of the erythrocytes from the plasma. The erythrocytes, or fractions thereof, may be dehydrated by conventional techniques—i.e. vacuum, drum, tray, freeze drying and the like.

Other nucleoprotein material may be used in the present invention, typically including organ tissue such as thymus, spleen, pancreas, liver and testes. The organ tissue may be treated much as described with respect to milt, blood and microbials for purposes of stabilizing and/or concentrating the nucleoprotein material. For example, skin and connective tissue may be removed. The tissue may be finely cut or chopped so that it can be easily and thoroughly dispersed in the aqueous medium. The tissue may be dried using alcohols such as methanol, ethanol or isopropanol.

The following examples are for purposes of illustrating the present invention and are not intended for purposes of limitation.

EXAMPLE I

Dried fish milt material was prepared from frozen fresh salmon milt. The milt was thawed and blended with a Waring Blender to yield a homogeneous pasty, but flowable, material. The blended salmon milt was dispersed in ten volumes of 95% ethanol and brought to boiling. The solids were then filtered to yield an ethanol wet product. A portion of the wet product was washed twice with ten volumes of 95% ethanol, filtered, air dried and ground. The dried fish milt material was a creamy white product. The dried milt material was compared to conventional starch as a fluid loss inhibitor in brine type drilling fluids. Six samples of salt water drilling fluids were prepared. Each sample contained 350 grams of water, 125 grams of sodium chloride and 25 grams of attapugite clay. Samples I–A, I–B and I–C each further included 2, 4 and 6 grams, respectively, of the dried fish milt material. Samples I–D, I–E and I–F further included 2, 4 and 6 grams, respectively, of an oxidized starch (produced by Baroid Division of National Lead Co. under the designation Impermex) of the type commercially used in drilling fluids. The fluid loss control agent was added to the drilling fluid and vigorously agitated for 1 minute and placed in a water bath at 80° F. for 20 hours and again agitated for 1 minute using a Waring Blender. The viscosity of each mud was determined using Fann Viscometer (Model Number 35) equipped with a ⅕ spring. The mud in each case was at 80° F. The results are shown in Table I.

TABLE I

| Sample | Nucleoprotein muds | | | Soluble starch muds | | |
|---|---|---|---|---|---|---|
|  | A | B | C | D | E | F |
| Viscosity (cps.) at— | | | | | | |
| 100 r.p.m | 46.8 | 76.8 | 147.0 | 38.4 | 33.6 | 25.8 |
| 300 r.p.m | 29.6 | 37.4 | -------- | 17.4 | 16.6 | 14.4 |
| 600 r.p.m | 22.2 | 25.5 | -------- | 11.8 | 11.8 | 11.0 |

Each sample was tested in a Baroid Low Pressure Filter Press using the standard API procedure API RP 13B. Table II shows the results.

TABLE II

| Sample | Milt muds | | | Soluble starch muds | | |
|---|---|---|---|---|---|---|
|  | A | B | C | D | E | F |
| Test of— | | | | | | |
| Spurt loss, ml | None | None | None | 2 | 2 | 2 |
| 7.5 minutes, ml | 13.5 | 8 | 8 | 23 | 13 | 7 |

EXAMPLE II

Nine samples of salt water fluids were prepared, each starting with a solution of 350 milliliters of 26% sodium chloride by weight. The dried fish milt material described in Example I was compared with guar gum, starch (Impermex) and hydroxyethylcellulose as fluid loss inhibitors. The fluid loss inhibitors were added in amounts as shown in Table III (one gram of fluid loss inhibitor per 350 milliliters of fluid is equivalent to one pound of fluid loss inhibitor per conventional barrel of fluid) and agitated for 2 minutes using a Waring Blender at full speed. The mixtures were each transferred to a pint jar which was placed in a water bath for 2 hours at 25° C. The samples were each again agitated for 2 minutes using a Waring Blender at full speed. The samples were then each placed into a Low Pressure Baroid Filter Press cell fitted with a Whatman No. 50 filter paper and tested using the procedure mentioned in Example I. The cell was closed and a pressure of 100 p.s.i.g. was applied using nitrogen gas. The amount of fluid discharge from the cell during the first 7½ minutes was as shown in Table III.

TABLE III

| Sample | Fluid loss inhibitor | Grams of fluid loss inhibitor added | Milliliters of fluid discharged |
|---|---|---|---|
| II-A | Milt | 2.0 | 10.0 |
| II-B | do | 1.0 | 13.5 |
| II-C | do | 0.5 | 23.5 |
| II-D | do | 0.25 | 31.0 |
| II-E | Guar gum | 3.0 | 27.0 |
| II-F | do | 2.0 | 61.5 |
| II-G | do | 1.0 | 193.0 |
| II-H | Soluble starch | 6.0 | 58.5 |
| II-I | Hydroxyethylcellulose | 2.0 | 335.0 |

EXAMPLE III

Five samples of salt water drilling fluids were prepared each starting with 350 milliliters of a 25% calcium chloride solution by weight. The dried fish milt material described in Example I was compared with guar gum. The samples were prepared and tested as described in Example I. Table IV shows the results.

TABLE IV

| Sample | Fluid loss inhibitor | Grams of fluid loss inhibitor | Milliliters of fluid discharged in 7½ minutes |
|---|---|---|---|
| III-A | Milt | 2.0 | 7.5 |
| III-B | do | 1.0 | 14.5 |
| III-C | do | 0.5 | 19.0 |
| III-D | do | 0.25 | 32.5 |
| III-E | Guar gum | 2.0 | 196.0 |

EXAMPLE IV

The effect of elevated temperatures on salt water drilling fluids containing milt was determined. Three 350 milliliter samples were prepared starting with a solution of 26% sodium chloride and adding 0.5 gram of the dried milt of Example I. The fluid was agitated for 2 minutes using a Waring Blender at full speed. The mixtures were each transferred to a pint jar which was placed in a water bath for 4 hours at the temperature shown in Table V. The samples were each again agitated for 2 minutes using a Waring Blender at full speed. The fluids were maintained at elevated temperature and tested as described in Example I. The results are shown in Table V.

TABLE V

| Sample | Fluid temperature, °F. | Milliliters of fluid discharged in 7½ minutes |
|---|---|---|
| IV-A | 120 | 21.0 |
| IV-B | 160 | 18.5 |
| IV-C | 200 | 19.5 |

EXAMPLE V

A fluid or mud was prepared according to the present invention using an organic salt to solubilize the fish milt. About 1.5 grams of the dried milt described in Example I and 0.1 gram of sodium dodecyl sulfate were added to 350 milliliters of water. The mixture was gently stirred until a change in viscosity was noted. Then 0.05 gram of pine oil were added with mixing. Next 5.0 grams of bentonite were added to the fluid. About 0.05 gram of the sodium salt of polyacrylic acid were added to deflocculate and disperse the clay in the fluid. The resulting mixture was aged for 2 hours at 80° F. The viscosity of the mud was determined using a Fann Viscometer as described in Example I. The viscosity was 23.4 cps. at 100 r.p.m.; 21 cps. at 300 r.p.m.; and 15 cps. at 600 r.p.m. The fluid loss characteristics of the mud were determined using the API Fluid Loss Test Procedures described in Example I. The Spurt Loss was 0 milliliter and the drip loss at 100 p.s.i.g. for 7.5 minutes was 14 milliliters.

EXAMPLE VI

A non-saline, aqueous fluid containing the present fluid loss control agent was prepared using turkey blood as the nucleoprotein source. The fluid was prepared by dispersing 0.3 part turkey blood whole erythrocytes (dry weight) in 99 parts of water. Then 0.7 part of sodium dodecyl sulfate were added and dispersed. The resulting fluid was viscous and had good fluid loss properties. The fluid loss properties were determined as described in Example I. The 350 milliliter sample lost 10 milliliters during 7½ minutes.

The embodiments of the invention in which an exclusive property or privilege is claimed are defined as follows:

1. A method for controlling the loss of an aqueous fluid into the formations defining a well, said method comprising:
    incorporating a fluid loss control agent in an aqueous fluid to form a sol, said fluid loss control agent consisting essentially of solubilized nucleoprotein material, said nucleoprotein material being obtained from the group consisting of fish milt, avian blood, thymus, spleen, pancreas, liver and testes, said nucleoprotein material from fish milt being solubilized by treatment with a member selected from the group consisting of water soluble inorganic salts, ampho-teric surfactants and anionic surfactants, said nucleoprotein from avian blood, thymus, spleen, pancreas, liver and testes being solubilized by treatment with a member selected from the group consisting of ampho-teric surfactants and anionic surfactants; and injecting said sol into said well.

2. The method of claim 1 wherein the nucleoprotein material is fish milt that has been solubilized with an inorganic salt.

3. The method of claim 2 wherein the fish milt is present in an amount of 0.01 to 1.0% by weight and the inorganic salt is present in an amount of at least about 6% by weight based on the total weight of the fluid.

4. The method of claim 3 wherein the fish milt is present in an amount of 0.1 to 0.5% by weight.

5. The method of claim 3 wherein the inorganic salt is selected from the group consisting of sodium chloride, calcium chloride, calcium nitrate and zinc chloride.

6. The method of claim 5 wherein the inorganic salt is present in an amount of about 25% by weight.

7. The method of claim 1 wherein the nucleoprotein material has been solubilized with an organic salt selected from the group consisting of synthetic anionic surfactants, amphoteric surfactants and soaps.

8. The method of claim 7 wherein the nucleoprotein material is present in an amount of 0.01 to 1.0% by weight and the organic salt is present in an amount of from 0.04 to 1.0% by weight based on the total weight of the fluid.

9. The method of claim 1 wherein the aqueous fluid is a drilling mud and further includes clay.

10. The method of claim 1 wherein the aqueous fluid is a completion fluid.

11. The method of claim 1 wherein the aqueous fluid is a hydraulic fracturing fluid.

12. An aqueous drilling mud including from 6.0 to 25% water soluble inorganic salt, 0.1 to 0.5% fish milt and 1.0 to 10.0% clay by weight based on the total weight of the mud.

References Cited

UNITED STATES PATENTS

| | | | |
|---|---|---|---|
| 3,198,268 | 8/1965 | Lindblum et al. | 252—8.5 X |
| 2,209,591 | 7/1940 | Barnes | 252—8.5 |
| 3,494,792 | 2/1970 | Sowell et al. | 252—8.5 X |

HERBERT B. GUYNN, Primary Examiner

U.S. Cl. X.R.

252—8.5 A, 8.55 R